Jan. 30, 1962  N. T. BRUBER  3,019,149
TIRE AND METHOD OF MAKING SAME
Filed Aug. 20, 1957

INVENTOR.
NORMAN T. BRUBER
BY
W. A. Fraser
ATTY.

United States Patent Office 3,019,149
Patented Jan. 30, 1962

3,019,149
TIRE AND METHOD OF MAKING SAME
Norman T. Bruber, Huntington Park, Calif., assignor to
The Firestone Tire & Rubber Company, Akron, Ohio,
a corporation of Ohio
Filed Aug. 20, 1957, Ser. No. 679,305
1 Claim. (Cl. 156—87)

This invention relates to pneumatic tires and method of making the same, and, more particularly is concerned with providing a pneumatic tire that comprises a plurality of rubberized cord fabric plies initially having numerous openings therethrough in the form of small slits through the rubber separating the cords.

In the present application "tire body" is to be understood to mean that portion of the tire constructed by superimposing plies of rubber-coated fabric upon one another and anchoring them at the tire beads.

It has long been recognized in the tire building industry that the presence of air in the tire during the molding and vulcanization of the tire frequently resulted in defects, such as blistering, separations and deterioration of the tire materials. Some cases of trapped air could be detected by inspection after the tires were molded but others were recognizable only, by premature failure of a tire, in which one or more such defects occurred. Many expedients have been tried to eliminate trapped air in the tire body but without single success until the present invention.

It is an object of the present invention to provide a tire substantially free of trapped-air in the tire body.

Another object of the present invention is to provide cord tire ply fabric so constructed that when cut into tire plies and such plies are superposed relative to each other on a tire building drum, that air, which otherwise would be trapped between the plies, will escape to the atmosphere through small openings pierced between the cords of said plies.

With the above and other objects in view the invention may be said to comprise the tire and body fabric employed in building the tire as explained hereinafter and illustrated by the accompanying drawings, together with such variations and modifications thereof as will be apparent to those skilled in the art to which the invention appertains.

Reference should be had to the accompanying drawing forming a part of this specification, in which.

Figure 1:
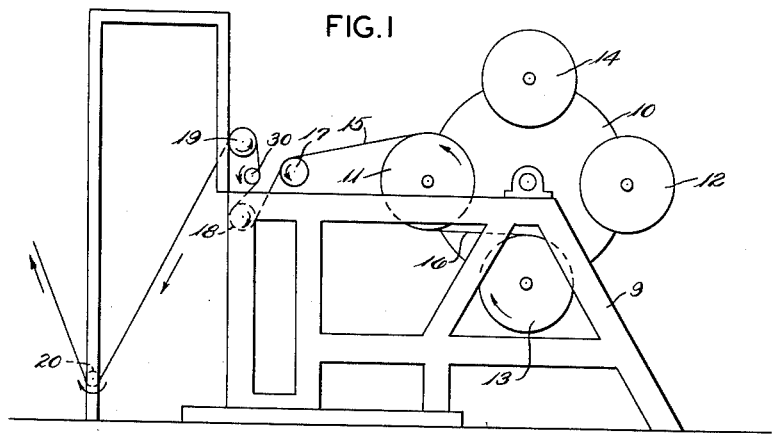
FIGURE 1 is a diagrammatical view of a known bias cutter let-off mechanism except the course of travel of rubberized cord tire fabric illustrated passing through the apparatus is interrupted by a perforating roller.
Figure 4:
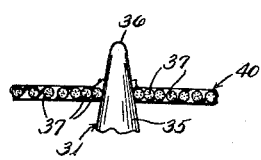
FIGURE 4 illustrates the manner a pin of FIG. 3 pierces a rubberized sheet of cord fabric.

Referring now to the drawing in more detail and to FIGURE 1 in particular it will be seen that a frame 9 supports a stock roll 10 on which is mounted rolls of stock 11 and 12 and liner take-up rolls 13 and 14. Rolls 11 and 13 are illustrated diagrammatically as in operation with rubberized cord tire ply fabric 15 advancing to a bias cutter, not shown, where it will be cut into proper widths to be incorporated into a tire body. The liner 16 is being taken-up on roll 13. When the said ply stock on roll 11 has been exhausted roll 10 will be revolved to bring rolls 14 and 12 into operating position and rolls 11 and 13 replaced with a new supply of fabric 15 on roll 11 and an end of the liner separating the convolutions of fabric 15 on roll 11 being manually given its initial winding on roll 14. Fabric 15 in its course to the bias cutting operation passes over idler roll 17, driven rolls 18 and 19 and dancing roll 20 all as will be understood by those familiar with tire fabric bias cutting operations. The bias cutter let-off mechanism referred to being well known further description of its structure is not necessary for a complete disclosure of the present invention. The present invention combines with the foregoing bias cutter let-off mechanism a fabric piercing roll 30 disposed in the path of travel of fabric 15 from roll 18 to roll 19. Stock rolls 11 and 12 are subjected to braking when in operation which places fabric 15 under tension providing the necessary frictional contact with rolls 18 and 19 to advance the fabric. Roll 30 is an idler roller and is so disposed as to press piercing pins 31 through and a distance beyond ply fabric 15 between the cords thereof as shown in FIG. 4. Obviously roll 30 could be driven to modify the manner the ply fabric is pierced and the shape and size of pins 31 may be changed as found desirable without departing from the spirit of the invention.

Roll 30 may be hollow with internally threaded holes in its wall to receive, in threaded relation, the externally threaded portion 32 of pins 31. Said pins are provided with substantially square shoulders 33 with rounded corners 34 on the fabric facing side thereof and piercing points 35 which points are illustrated as being of conical shape with rounded apices 37.

Figures 3, 5:
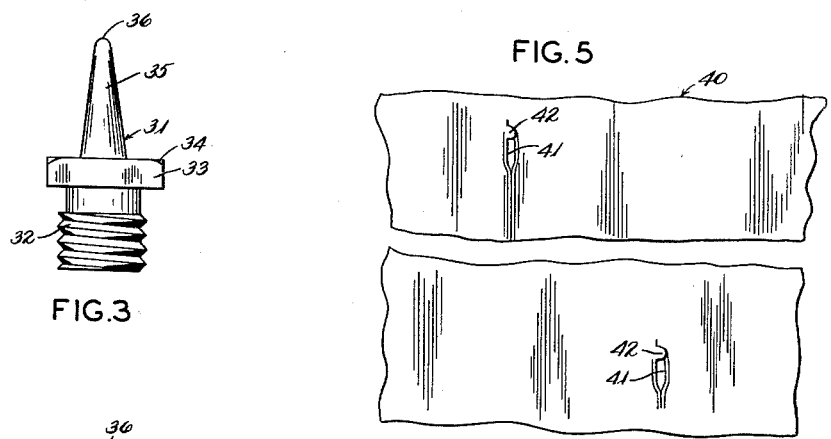
FIGURE 3 is an enlarged view of a piercing pin of FIG. 2.
FIGURE 5 is a plan view of a fragment of cord fabric illustrating its appearance after it has been pierced and before it has been molded and vulcanized in a tire.

The rounded point or apex of pin 31 pushes cords 37 of ply 40 to one side as the pin pierces said ply as will be seen by reference to FIGS. 4 and 5. The diameter of roll 30 and length of pins 31 are such that the pin passes into and out of ply 40 by a rocking motion that causes the pin to scrape a small amount of rubber from between the cords for a short distance as will be seen by reference to FIG. 5. This action of the pins form small openings 41 that remains open during the assembly of said fabric plies on a tire building drum. The rubber pin 31 scrapes from between two cords in forming a hole 41 is pushed to one end of the hole or small slot 41 and deposited there as illustrated at 42.

One of the important features of the present invention is the forming of hole 41 by lateral displacement of the cords and rubber, without breaking or cutting said cords, in such manner that the hole will remain open during subsequent handling of the ply fabric in the interval between the time the rubberized fabric is pierced and it becomes tire plies in the body of a tire. It is to be noted (see FIG. 4) that pin 3 does not scrape all rubber from the cords at the sides of a hole 41 which is a desirable feature as will be explained as this description continues.

When tire fabric pierced as explained above has been cut into strips of proper widths for tire plies and a tire body is being fabricated from such strips the following procedure has been found satisfactory. If a tubeless tire of the open-bead type is to be built a special air impervious lining is commonly used and in this case all the tire plies may be of fabric embodying the perforations 41. If a conventional tire is being built, that is one without a special lining, then the first ply preferably is not perforated as various materials commonly used on inside of tires preparatory to molding and curing same would enter the tire body through said perforations. However, all except the first ply, in the conventional tire, are constructed with the pierced fabric.

Figure 2:
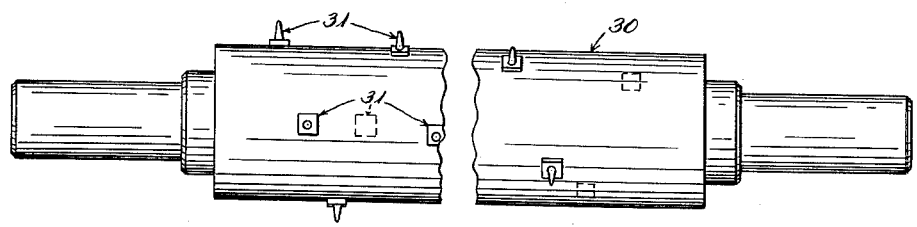
FIGURE 2 is a longitudinal view of the perforating roll shown in FIG. 1, and illustrating the disposition of the piercing pins relative to the perforating roll.

Referring now to FIG. 2 applicant prefers to arrange pins 31 approximately 2″ apart and off-set circumferentially of the roll about ¼″. Applicant further prefers to have the relative dimensions of the circumference of roll 30 and pins 31 such as to form holes 41 approximately from 1/32″ to 1/16″ wide and from 1/8″ to ¼″ long.

Heretofore as the successive plies of a tire were superimposed air became trapped between the plies. Frequently the trapped air would be evidenced by so called blisters that were visable to a tire builder, who, as a routine practice, was supposed to insert an awl through the fabric into the blister and cause the trapped air to escape through the awl hole. Such blisters occur so frequently that as a practical matter it is impossible to have tire builders remove all such blisters and, as a matter of cost of building a tire, the careful inspection for such often numerous, blisters is very expensive. It is only when a large pool of air is trapped that it may be detected as a blister. The innumerable small traps of air cannot be detected or removed to any substantial degree. The present invention insures an opening through which the air, that otherwise would be trapped between the plies, will escape to the atmosphere and in practice it has been found that with any given method of assembling said plies successively that before cure a much firmer tire body results and that the amount of air trapped in the tire body is substantially reduced. It has also been found that manufacturing defects of the type attributable to trapped air are substantially eliminated.

Cord tires are built to a size, preparatory to molding, that subjects the tire body to some stretching when the tire is forced against its mold during molding and vulcanization of the tire. The cords 36 are stretched longitudinally, as will be understood by those familiar with the manufacture of tires, and this stretching corrects the deflection from original cord direction adjoining the sides of holes 41. It is to be noted, however, that such deflection of cord is very slight. It is a usual practice to subject cord fabric to a coating by dipping in material adapted to provide a better union of the rubber to the cords. This coat adheres lightly to the cords and rubber and is not removed by the scraping of pins 31 when holes 41 are made and there is also a thin coat of rubber at the sides of said holes. Additionally the pressure to which the tire is subjected during molding and vulcanization causes the small excess of rubber at 42 to reenter hole 41 and thereby the cords 36 resume their original parallel and spaced relation separated by their original coating.

For purpose of illustration the present invention has been disclosed in connection with a bias cutter let-off mechanism but it is not to be so limited as obviously the holes 41 may be formed at any time after the cord fabric is rubberized until the plies are super-imposed and by various apparatus within the spirit of the present invention.

The term "rubber" as used herein comprehends synthetic as well as natural rubber.

It will now be seen that the invention produces a tire with less air trapped therein than has been possible by the prior art methods of building tires. It will also be seen that the present invention substantially reduces manufacturing defects as well as improved tires.

The detailed description of the particular embodiment of the invention illustrated and described herein is not to be construed as limiting the invention thereto. The invention includes all features of patentable novelty residing in the foregoing description and the accompanying drawings.

I claim:

A method of producing perforated tire ply material, comprising the steps of uniting a sheet of cord fabric with an unvulcanized rubbery material, thereafter positively moving the resulting unvulcanized, rubberized sheet into driving engagement with a plurality of piercing members, deflecting adjacent cords of said rubberized sheet in opposite directions and forming longitudinally extending openings therein, and displacing a portion of said rubbery material from between said deflected cords in a direction parallel to said cords, while maintaining said rubberized sheet in the unvulcanized state, whereby to provide in said unvulcanized, rubberized sheet a plurality of longitudinally extending voids between adjacent cords thereof.

References Cited in the file of this patent

UNITED STATES PATENTS

| | | |
|---|---|---|
| 688,302 | Grether | Dec. 10, 1901 |
| 1,978,620 | Brewster | Oct. 30, 1934 |
| 2,055,002 | Chandler | Sept. 22, 1936 |
| 2,275,612 | Chandler | Mar. 10, 1942 |
| 2,650,642 | Reheiser | Sept. 1, 1953 |
| 2,770,282 | Herzech | Nov. 13, 1956 |
| 2,779,386 | Waters | Jan. 29, 1957 |